United States Patent
Yu et al.

(10) Patent No.: US 9,148,745 B2
(45) Date of Patent: Sep. 29, 2015

(54) COMMUNICATION METHOD OF MTC DEVICES AND RELATED APPARATUS

(71) Applicant: Huawei Technologies Co., Ltd., Shenzhen (CN)

(72) Inventors: Yinghui Yu, Shenzhen (CN); Miao Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 100 days.

(21) Appl. No.: 13/763,146

(22) Filed: Feb. 8, 2013

(65) Prior Publication Data
US 2013/0148564 A1    Jun. 13, 2013

Related U.S. Application Data

(63) Continuation of application No. PCT/CN2011/078004, filed on Aug. 4, 2011.

(30) Foreign Application Priority Data

Aug. 13, 2010 (CN) .......................... 2010 1 0254197

(51) Int. Cl.
*H04H 20/71* (2008.01)
*H04W 4/00* (2009.01)
*H04W 8/18* (2009.01)
(Continued)

(52) U.S. Cl.
CPC ............... *H04W 4/005* (2013.01); *H04W 4/08* (2013.01); *H04W 8/186* (2013.01); *H04W 74/085* (2013.01); *H04W 72/121* (2013.01)

(58) Field of Classification Search
None
See application file for complete search history.

(56) References Cited

U.S. PATENT DOCUMENTS

| 2010/0057485 A1 | 3/2010 | Luft |
| 2010/0146117 A1 | 6/2010 | Hoeksel |

(Continued)

FOREIGN PATENT DOCUMENTS

| CN | 101459899 A | 6/2009 |
| CN | 101730136 A | 6/2010 |
| CN | 201528425 U | 7/2010 |

OTHER PUBLICATIONS

Written Opinion of the International Searching Authority issued in corresponding PCT Patent Application No. PCT/CN2011/078004, mailed Nov. 17, 2011.

(Continued)

*Primary Examiner* — Otis L Thompson, Jr.
(74) *Attorney, Agent, or Firm* — Brinks Gilson & Lione

(57) ABSTRACT

A communication method of MTC devices in the field of communication technologies, including: grouping, by a network side, first MTC devices according to time when the first MTC devices access a network, where the grouping is so performed that MTC devices accessing the network at same time are grouped into different groups, and MTC devices accessing the network at different time are grouped into a same group; and sending, after the first MTC devices access the network, group information to the first MTC devices, so that the first MTC devices receive and/or send data according to the group information. Embodiments of the present invention further provide a related communication apparatus of MTC devices. Embodiments of the present invention realize scattering time for MTC devices to access a network for sending data, thereby avoiding collisions and effectively easing the burden resulted from MTC devices accessing the network concurrently.

9 Claims, 5 Drawing Sheets

(51) Int. Cl.
*H04W 4/08* (2009.01)
*H04W 74/08* (2009.01)
*H04W 72/12* (2009.01)

(56) References Cited

U.S. PATENT DOCUMENTS

| | | | |
|---|---|---|---|
| 2011/0201344 A1* | 8/2011 | Ryu et al. | 455/450 |
| 2011/0244907 A1* | 10/2011 | Golaup et al. | 455/509 |
| 2011/0292893 A1* | 12/2011 | Lee et al. | 370/329 |
| 2012/0030358 A1* | 2/2012 | MacKenzie | 709/226 |
| 2012/0082103 A1* | 4/2012 | Lin et al. | 370/329 |
| 2013/0005387 A1* | 1/2013 | Aso et al. | 455/517 |
| 2013/0046821 A1* | 2/2013 | Alanara et al. | 709/204 |
| 2013/0051228 A1* | 2/2013 | Kim et al. | 370/230 |
| 2013/0121303 A1* | 5/2013 | Cho et al. | 370/329 |

OTHER PUBLICATIONS

International Searching Authority issued in corresponding PCT Patent Application No. PCT/CN2011/078004, mailed Nov. 17, 2011.

* cited by examiner

COMMUNICATION METHOD OF MTC DEVICES AND RELATED APPARATUS

CROSS-REFERENCE TO RELATED APPLICATIONS

This application is a continuation of International Application No. PCT/CN2011/078004, filed on Aug. 4, 2011, which claims priority to Chinese Patent Application No. 201010254197.3, filed on Aug. 13, 2010, both of which are incorporated herein by reference in their entirety.

FIELD OF THE INVENTION

The present invention relates to the field of communication technologies, and in particular, to a communication method of MTC devices and related apparatus.

BACKGROUND OF THE INVENTION

A machine type communication (MTC, Machine-Type Communication) application refers to network communications performed by one network element or between multiple network elements without human involvement, that is, a machine to machine (M2M, Machine To Machine) application, such as applications for traffic control and management, factory monitoring, and remote metering. In an M2M application, multiple machine to machine equipment (M2ME, Machine To Machine Equipment) having same M2M application functions form a unit, which is referred to as a group (Group) for short.

In embodiments of the present invention, a user equipment involved in an MTC application is referred to as an MTC device, which may also be referred to as an MTC user, an M2M user, or an M2M device etc. This type of MTC devices are devices of which physical layers, access Stratum, and non-access Stratum are specially simplified for an MTC application. The characteristics of this type of MTC devices include: the interaction traffic of every MTC device may be very small and the interaction may burst; the location of an MTC device may be relatively fixed or seldom changed; and an MTC device implements relatively simple function, where only specific information transmission and interaction needs to be completed; and behavior of the MTC devices under a specific application is consistent. For example, in a smart metering service, all MTC devices upload data to a specific server at specific time.

In an M2M application, there are a large number of MTC devices. Massive MTC devices, if they access a network and compete for network resources, bring a new burden to the existing network, especially in some application scenarios such as a smart metering service. In many countries, a smart grid requires a large number of MTC devices upload metering data frequently at an interval of 5 minutes, and the size of the metering data is relatively small. A large number of MTC devices need to periodically and frequently initiate uplink data transmission, the data size is small, and the sending occasion is relatively fixed, which result in a serious burden on the network.

In the prior art, in order to prevent massive MTC devices from simultaneously accessing a network and causing a serious burden on the network, a solution for grouping on the application layer is proposed. That is, MTC devices are grouped on the application layer according to users' quality of service (QoS, Quality of Service) requirements, uploading destination addresses, or location information, and the like, and the number of MTC devices simultaneously accessing the network is controlled by using group paging, thereby avoiding the cases of massive MTC devices accessing the network simultaneously.

However, the application layer cannot obtain information about a cell in which an MTC device camped; therefore, the grouping on the application layer cannot ensure that users in different cells are balanced.

Therefore, the existing grouping solution based on the application layer cannot ensure that users in different cells are balanced, and the circumstance of concurrent accessing by users in a cell still persists.

SUMMARY OF THE INVENTION

Embodiments of the present invention provide a communication method of MTC devices and related apparatus to prevent MTC devices from concurrently accessing a network and causing a burden on the network.

Embodiments of the present invention are implemented by using the following technical solutions.

Embodiments of the present invention provide a communication method of machine type communication MTC devices, including:

grouping, by a network side, first MTC devices according to time when the first MTC devices access a network, where the grouping is so performed that MTC devices accessing the network at same time are grouped into different groups, and MTC devices accessing the network at different time are grouped into a same group; and sending, after the first MTC devices access the network, group information to the first MTC devices, so that the first MTC devices receive and/or send data according to the group information.

Embodiments of the present invention provide a network apparatus, including:

a grouping unit configured to group first MTC devices according to time when the first MTC devices access a network, where the grouping is so performed that MTC devices accessing the network at same time are grouped into different groups, and MTC devices accessing the network at different time are grouped into a same group; and a sending unit configured to, after the first MTC devices access the network, send group information of the grouping unit to the first MTC devices, so that the first MTC devices receive and/or send data according to the group information.

Embodiments of the present invention provide a communication method of a machine type communication MTC device, including:

receiving, by a first MTC device, a group parameter sent by a network side;

determining time for the first MTC device to access a network according to the group parameter and a relevant identifier of the MTC device;

after the first MTC device accesses the network, receiving group information sent by the network side; and receiving and/or sending data according to the group information.

Embodiments of the present invention provide a machine type communication MTC device, including:

a receiving unit configured to receive a group parameter sent by a network side;

a computing unit configured to determine time for the MTC device to access a network according to a relevant identifier of the MTC device and the group parameter received by the receiving unit, where the receiving unit is furthered configured to, after the MTC device accesses the network, receive group information sent by the network side; and a data transmission controlling unit configured to receive and/or send data according to the group information.

According to the above technical solutions provided by embodiments of the present invention, embodiments of the present invention, by grouping MTC devices accessing at same time into different groups and MTC devices accessing at different time into a same group, realize scattering moments for MTC devices to access a network and send data, thereby avoiding collisions and effectively easing the burden resulted from MTC devices accessing the network concurrently.

DETAILED DESCRIPTION OF THE EMBODIMENTS

The technical solutions in embodiments of the present invention are hereinafter described clearly and completely with reference to the accompanying drawings in embodiments of the present invention. It may be understood that the described embodiments are only a part rather than all of embodiments of the present invention. Based on embodiments of the present invention, all other embodiments obtained by persons of ordinary skill in the art without creative efforts shall fall within the protection scope of the present invention.

Figure 1:
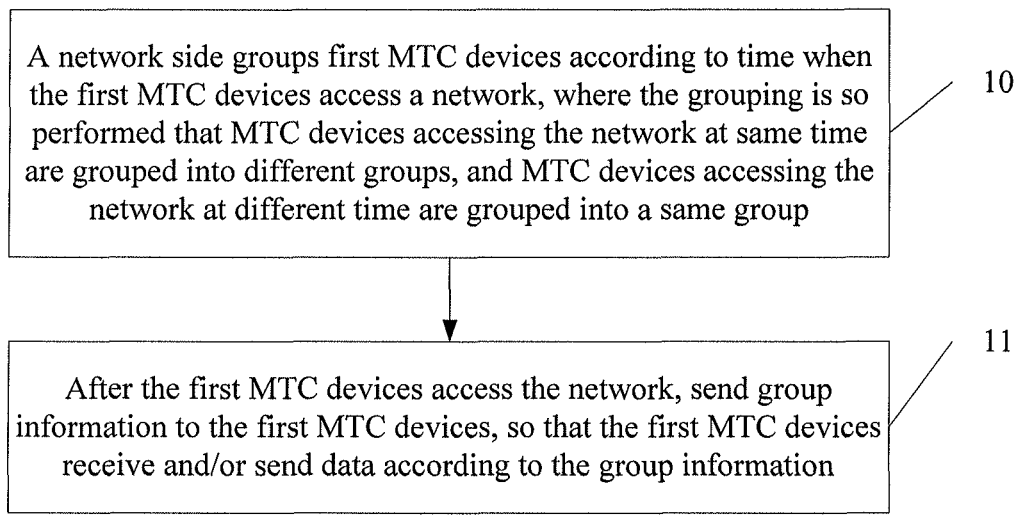
FIG. 1 is a flowchart of a communication method of MTC devices according to an embodiment of the present invention.

An embodiment of the present invention provides a communication method of MTC devices, as shown in FIG. 1, including the following steps:

Step 10. Group, by a network side, first MTC devices according to time when the first MTC devices access a network, where the grouping is so performed that MTC devices accessing the network at same time are grouped into different groups, and MTC devices accessing the network at different time are grouped into a same group.

In the embodiment of the present invention, the first MTC devices may be any MTC devices.

Time when the first MTC devices access the network includes: time when the first MTC devices access the network initially; or time determined according to group parameters for the first MTC devices to access the network. The group parameters are the parameters configured or computed by a network side for the MTC devices and used to determine time for the MTC to access the network, so that the MTC devices may be grouped according to the time for accessing the network. The group parameters may include: a data transmission period of the first MTC devices and time duration in unit for uploading data every turn configured by a network side for MTC devices; or a ratio between the data transmission period of the first MTC devices and the time duration in unit for uploading data every turn; or the allowable transmission number for uploading data within a data transmission period configured by the network side for MTC devices in a same group. Because the data transmission periods of the MTC devices in a same group are same, the allowable transmission number for uploading data within a data transmission period configured by the network side for the MTC devices in a same group, is the total transmission number for uploading data within a transmission period of the MTC devices in the group configured by the network side for all MTC devices in the same group. The data transmission period of the first MTC devices may be a time interval for the first MTC devices to access the network and send data; and the time duration in unit for uploading time every turn may be a duration for the first MTC devices to send data one time.

In the embodiment of the present invention, an entity implementing the above configuration or computing function may be a base station on the network side, where the data transmission period may be configured by another entity on the network side and sent to the base station, and then sent to the first MTC devices by the base station.

The method for grouping the first MTC devices according to the time when the first MTC devices access the network initially may be, because MTC devices simultaneously accessing the network surely use different access resources, identifying whether the MTC devices access the network simultaneously according to the use of the access resources. The embodiment of the present invention sets no limit to how to perform identification. After the time when the MTC devices access the network is identified, MTC devices accessing the network at same time may be grouped into different groups, and MTC devices accessing the network at different time may be grouped into a same group.

The method for determining the time for the first MTC devices to access the network according to the group parameters may include:

first, obtaining the ratio between the data transmission period of the first MTC devices and the time duration in unit for uploading data every turn, or obtaining the allowable transmission number for uploading data within a data transmission period configured by the network side for MTC devices in a same group, where if the group parameters include the data transmission period of the first MTC devices and the time duration in unit for uploading data every turn, the ratio between the data transmission period of the first MTC devices and the time duration in unit for uploading data every turn is computed; and if the group parameters include the ratio between the data transmission period of the first MTC devices and the time duration in unit for uploading data every turn, the ratio is directly used;

then, computing the modulus of the ratio or the allowable transmission number by using a relevant identifier of the first MTC device and obtaining a modulo result, where the relevant identifier of the MTC device may be an international mobile subscriber identity (IMSI, International Mobile Subscriber Identity) of the MTC device, or a value derived from the IMSI, such a result of computing the modulus of the IMSI to an integer; and finally, determining that MTC devices having a same modulo result access the network at the same time.

In addition, in the embodiment of the present invention, the network side will send the group parameters to the first MTC devices, so that the first MTC devices determine the time for the first MTC devices to access the network according to the group parameters. The network side may send the group parameters to the first MTC devices by using a system message in broadcast mode before the first MTC devices access the network; in such cases, time when the first MTC devices access the network initially is the time for the first MTC devices to access the network determined according to the group parameters. The network side may also send the group parameters to the MTC devices by using dedicated signaling after the first MTC devices access the network; in such cases, time determined by the first MTC devices according to the group parameters for the first MTC devices to access the network is the time for subsequent accessing to the network, that is, the time when the first MTC devices access the network initially is not included. The method for the first MTC devices to determine the time for the first MTC devices to access the network according to the group parameters is same as the method for the network side to determine the time for the first MTC devices to access the network according to the group parameters. That is, in the embodiment of the present invention, the network side and the MTC devices determine the time for the MTC devices to access the network according to the same group parameters by using the same method.

The network side and the first MTC devices, while determining the time for accessing the network according to the modulo result, further compute a frame offset number and a subframe number on which the time for the first MTC devices to access the network is located, where floor (i*p/10) is used to compute the frame offset number on which the time for the first MTC devices to access the network within the current data transmission period is located; and (i*p) mod 10 is used to compute the subframe number on which the time for the first MTC devices to access the network within the current data transmission period is located, where i represents the time duration in unit for uploading data every turn, and p represents the modulo result of the relevant identifier of the first MTC device to the ratio or to the allowable transmission number.

According to the grouping method of this embodiment, there is no MTC devices accessing the network at the same time in every group. That is, MTC devices in every group access the network and send data at different occasion. Therefore, the accessing of the MTC devices in every group is scattered, thereby effectively avoiding the burden on the network caused by the MTC devices accessing concurrently.

Step 11. After the first MTC devices access the network, send group information to the first MTC devices, so that the first MTC devices receive and/or send data according to the group information.

In the embodiment of the present invention, after the first MTC devices are grouped, group information is delivered to the first MTC devices after the first MTC devices access the network, so that the first MTC devices receive and/or send data according to the group information. The group informations include at least one of group paging identifier information (GP-RNTI: Group paging Radio Network Temporary Identifier), a public cell radio network temporary identifier (C-RNTI, cell Radio Network Temporary Identifier or MTC-RNTI), and public radio bearer (RB, radio bearer) information.

In the embodiment of the present invention, the receiving and/or sending data by the first MTC devices according to the group information includes that, after the first MTC devices receives a GP-RNTI, the first MTC devices do not send back paging response information immediately, but access the network when the time for the first MTC devices to access the network is arrived, and then send a paging response, thereby reducing the impact on the network when multiple MTC devices simultaneously access the network.

The first MTC devices, after receiving a public C-RNTI or MTC-RNTI or public RB information, use the information for data transmission processing. That is, multiple MTC devices in a same group use the same C-RNTI or MTC-RNTI as a connection identifier and send and/or receive data on the obtained public RB. The public RB may be a dedicated RB shared by the group or a public RB shared by the group.

In the embodiment of the present invention, the execution entity is a network side device, such as a base station, an evolved base station, and the like.

The embodiment of the present invention, by grouping MTC devices accessing at same time into different groups so that each MTC device in a same group accesses the network at different occation, realizes scattering moments for MTC devices to access a network and send data, thereby avoiding collisions and effectively easing the burden resulted from MTC devices accessing the network concurrently. Meanwhile, embodiments of the present invention solve the problem that numbers of users accessed in different cells are unbalanced which cannot be solved by the random grouping method on the application layer in the prior art.

In order to further understand the above embodiments of the present invention, the method for the MTC devices to access the network provided by the present invention is described in detail with reference to specific examples.

EXAMPLE 1

Figure 2:
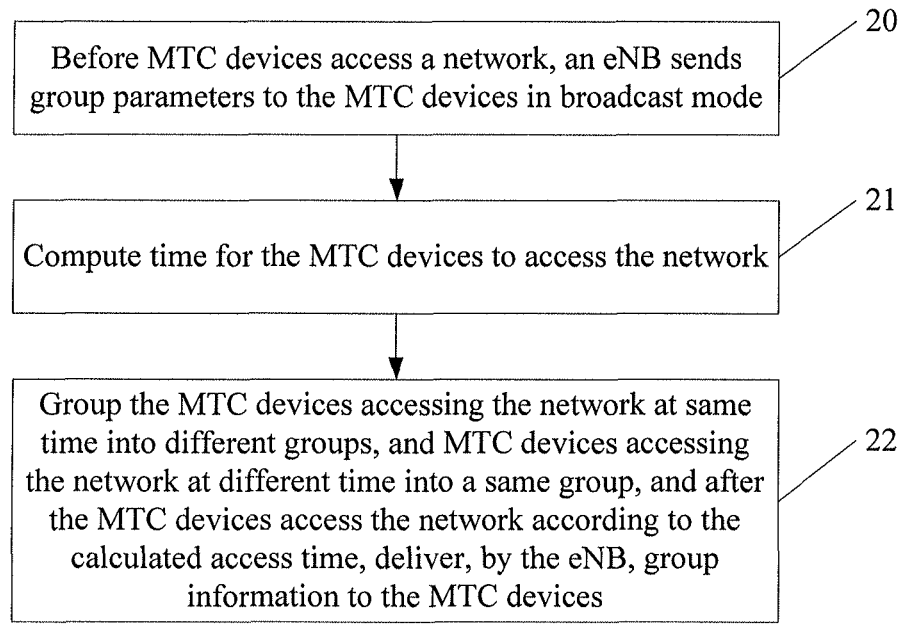
FIG. 2 is a flowchart of a communication method of MTC devices according to embodiment 1 of the present invention.

As shown in FIG. 2, the method includes the following steps.

Step 20. Before MTC devices access a network, send, by an eNB, group parameters to the MTC devices in broadcast mode.

The group parameters include a data transmission period T of the MTC devices and a time duration in unit i for uploading data every turn; or the group parameters include a parameter N, where N=data transmission period T of the MTC devices/time duration in unit for uploading data every turn; or the group parameters include the allowable transmission number N' for uploading data within a data transmission period configured by a network side for the MTC devices in a same group.

Step 21. Compute the time for the MTC devices to access the network.

The eNB and the MTC devices both compute the time for the MTC devices to access the network according to the IMSI and N values of the MTC devices, where the computation method is:

$$N=T/i;$$

$$P=IMSI \bmod N; \text{ or } P=IMSI \bmod N';$$

The frame offset number on which the time for the MTC devices to access the network within the current data transmission period is floor (i*p/10).

The subframe number on which the time for the MTC devices to access the network within the current data transmission period is x=(i*p) mod 10.

MTC devices having the same p value access the network at the same time.

Step 22. Group the MTC devices accessing the network at same time into different groups, and MTC devices accessing the network at different time into a same group, and after the MTC devices access the network according to the calculated access time, deliver, by the eNB, group information to the MTC devices.

In order to avoid collision, the MTC devices having the same p value are grouped into different groups, and the eNB records group information and assigns a shared connection to every group.

In the embodiment of the present invention, every transmission period is divided into multiple durations. The MTC devices are scattered into various transmission durations by performing a modulo operation on the IMSI related identifier of the MTC devices to N, and the MTC devices distributed in different transmission durations are grouped into one group, thereby ensuring that the MTC devices in every group access or send data in different durations.

The grouping method is exemplified as follows.

Assume $T=300$ ms, and $i=100$ ms, then, $N=3$.

Figure 3:
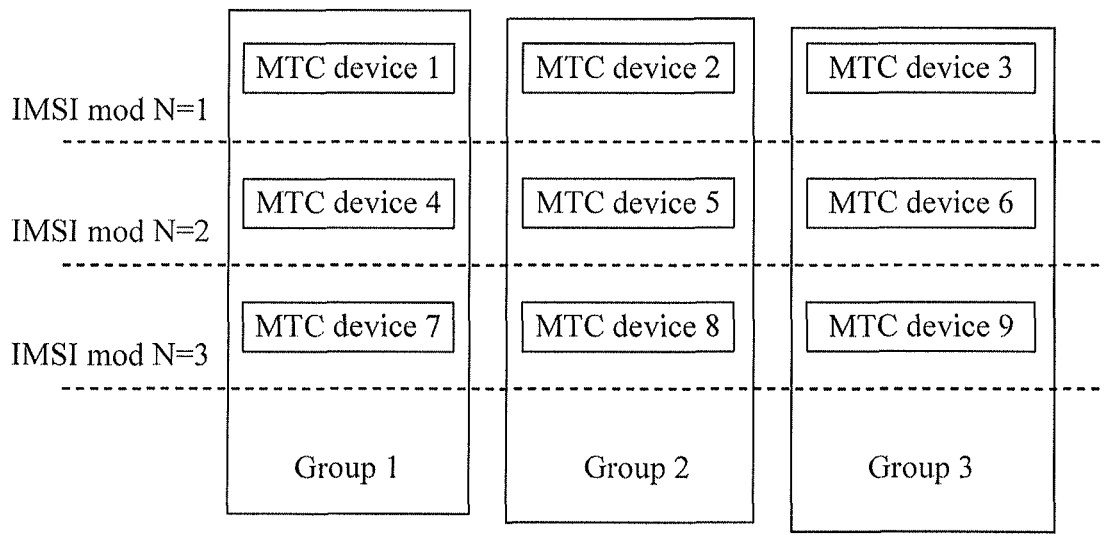
FIG. 3 is a schematic diagram of a communication method of MTC devices according to embodiment 1 of the present invention.

According to the grouping method of the present invention, an embodiment of the grouping of multiple MTC devices in a network may be derived, as shown in FIG. 3. Assume that MTC device 1, MTC device 2, and MTC device 3 modulo N would evaluate to 1, and they all send data in duration 1; similarly, MTC device 4, MTC device 5, and MTC device 6 send data in duration 2, and MTC device 7, MTC device 8, and MTC device 9 send data in duration 3. Therefore, the MTC devices sending data in the same duration are grouped into different groups.

The MTC devices accessing a network in different durations are grouped into one group. For example, MTC device 1 sending data in duration 1, MTC device 4 sending data in duration 2, and MTC device 7 sending data in duration 3 are grouped into group 1. Certainly, it is also possible to group MTC device 1 sending data in duration 1, MTC device 5 sending data in duration 2, and MTC device 9 sending data in duration 3 into the same group, as long as different MTC devices in a same group access the network at different time.

After the MTC devices access the network initially according to the computed time, the eNB delivers group information to the MTC devices.

The group information includes a GP-RNTI, a public cell radio network temporary identifier (C-RNTI or MTC-RNTI), and/or public radio bearer (RB, radio bearer) information.

The embodiment of the present invention realizes grouping accessing and data transmission of MTC devices on a radio access network (RAN, Radio Access Network) side, so that in a scenario of group-based radio resource control (RRC, Radio Resource Control) link management, the moments for the MTC devices to send data is scattered, thereby avoiding collisions and a burden on the network.

EXAMPLE 2

Figure 4:
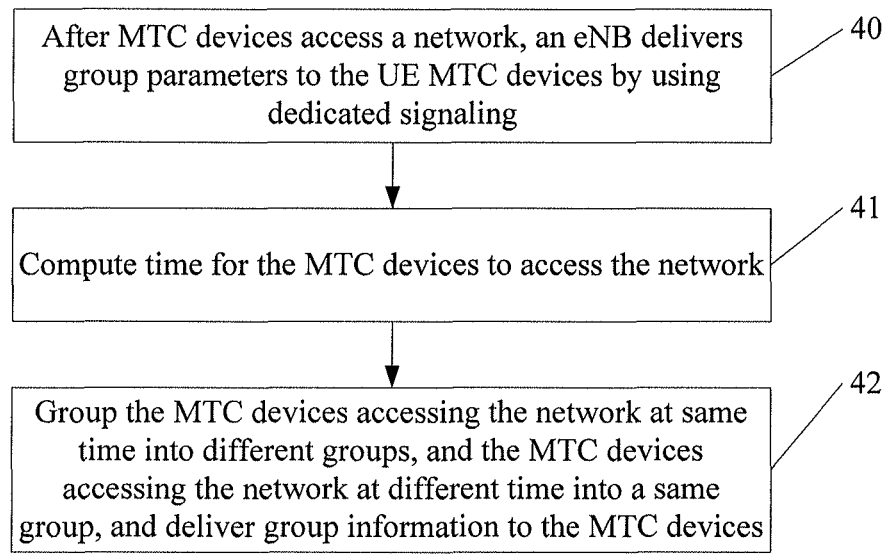
FIG. 4 is a flowchart of a communication method of MTC devices according to embodiment 2 of the present invention.

As shown in FIG. 4, the method includes the following steps.

Step 40. After MTC devices access a network, deliver, by an eNB, group parameter to the MTC devices by using dedicated signaling.

The group parameters include a data transmission period T of the MTC devices and a time duration in unit i for uploading data every turn; or the group parameters include a parameter N, where N=data transmission period T of the MTC devices/time duration in unit for uploading data every turn; or the group parameters include the allowable transmission number N' for uploading data within a data transmission period configured by a network side for the MTC devices in a same group.

Step 41. Compute the time for the MTC devices to access the network.

The eNB and the MTC devices both compute the time for the MTC devices to access the network according to the IMSI and N values of the MTC devices, where the computation method is:

$N=T/i;$ $P=IMSI \bmod N;$ or $P=IMSI \bmod N';$

The frame offset number on which the time for the MTC devices to access the network within the current data transmission period is floor (i*p/10)].

The subframe number on which the time for the MTC devices to access the network within the current data transmission period is x=(i*p) mod 10.

MTC devices having the same p value access the network at the same time.

Step 42. Group the MTC devices accessing the network at same time into different groups, and the MTC devices accessing the network at different time into a same group, and deliver group information to the MTC devices.

In order to avoid collisions, MTC devices having the same p value are grouped into different groups, and MTC devices accessing at different durations are grouped into one group. The eNB records group information and assigns a shared link to every group, so that the MTC devices receive and/or send data according to the group information.

In the embodiment of the present invention, every transmission period is divided into multiple durations. The MTC devices are scattered into various transmission durations by performing a modulo operation on the IMSI related identifier of the MTC devices to N, and the MTC devices distributed in different transmission durations are grouped into one group, thereby ensuring that the MTC devices in every group access or send data in different durations.

The group information includes a GP-RNTI, a public cell radio network temporary identifier (C-RNTI or MTC-RNTI), and/or public radio bearer (RB, radio bearer) information.

Later, the MTC devices access the network according to the computed access time.

The embodiment of the present invention realizes grouping accessing and data transmission of MTC devices on an RAN side, so that in a scenario of group-based RRC link management, the moments for the MTC devices to send data are scattered, thereby avoiding collisions and a burden on the network.

EXAMPLE 3

Figure 5:
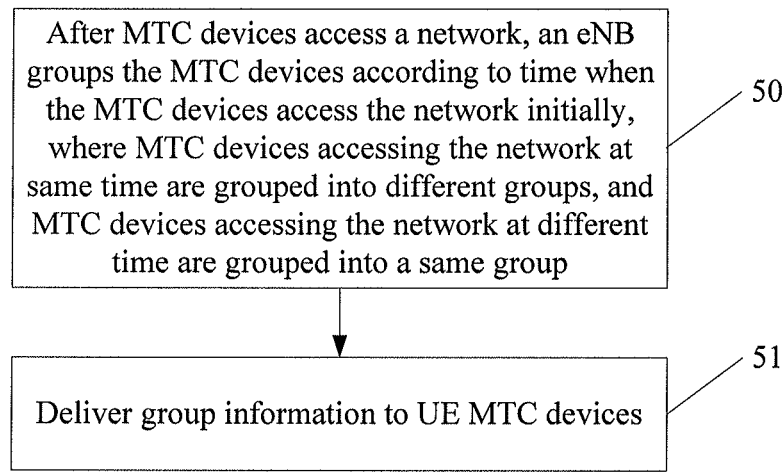
FIG. 5 is a flowchart of a communication method of MTC devices according to embodiment 3 of the present invention.

As shown in FIG. 5, the method includes the following steps.

Step 50. After MTC devices access a network, an eNB groups the MTC devices according to time when the MTC devices access the network initially, where MTC devices accessing the network at same time are grouped into different groups, and MTC devices accessing the network at different time are grouped into a same group.

Because every MTC device uploads data regularly at a specific interval, after the MTC devices access the network for the first time, the eNB, according to the information of the accessed MTC devices, groups the MTC devices accessing at same time into different RAN-side groups, thereby ensuring that no collision occurs when the MTC devices in one group use a public RB to send data in the future.

When an MTC device accesses the network initially, if there are other MTC devices accessing the network at the same time, the eNB groups the MTC devices accessing at the same time into different RAN groups, so that the MTC devices in a same group access the network at different time. Because the MTC devices accessing the network at the same time surely use different accessing resources, the use of the accessing resources may be used to identify whether the MTC devices access the network at the same time. The embodiment of the present invention sets no limit to how to perform the identification.

Step 51. Deliver group information to the MTC devices.

The eNB may use dedicated signaling to assign same group information to the MTC devices in a same group and send the group information to the MTC devices, such as a GP-RNTI, a public C-RNTI or MTC-RNTI, or public RB information. The eNB records the group information.

In the embodiment of the present invention, because the MTC devices have low mobility and the MTC devices access according to a specified time interval in the future, the formed groups may be reused.

The embodiment of the present invention realizes grouping accessing and data transmission of MTC devices on an RAN side, so that in a scenario of group-based RRC link management, the moments for the MTC devices to send data are scattered, thereby avoiding collisions and a burden on the network.

Figure 6:
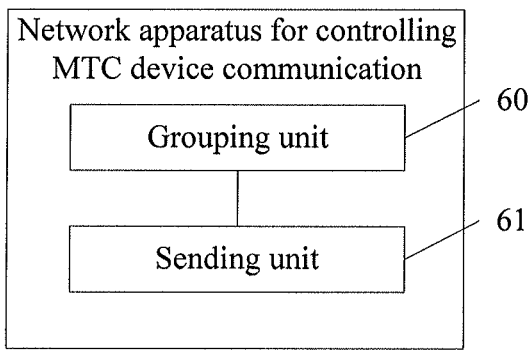
FIG. 6 is a schematic structural diagram of a network apparatus according to an embodiment of the present invention.

In order to implement the communication method of MTC devices according to the above embodiment of the present invention, an embodiment of the present invention provides a network apparatus, as shown in FIG. 6, including:

a grouping unit 60 configured to group first MTC devices according to time when the first MTC devices access a network, where the grouping is so performed that MTC devices accessing the network at same time are grouped into different groups, and MTC devices accessing the network at different time are grouped into a same group, so that the MTC devices in a same group access the network at different time; where time when the first MTC devices access the network include time when the first MTC devices access the network initially, or time determined according to group parameters for the first MTC devices to access the network; and the group parameters include a data transmission period of the first MTC devices and time duration in unit for uploading data every turn, or a ratio between the data transmission period of the first MTC devices and the time duration in unit for uploading data every turn; and a sending unit 61 configured to, after the first MTC devices access the network, send group information of the grouping unit 60 to the first MTC devices, so that the first MTC devices receive and/or send data according to the group information.

Figure 7:
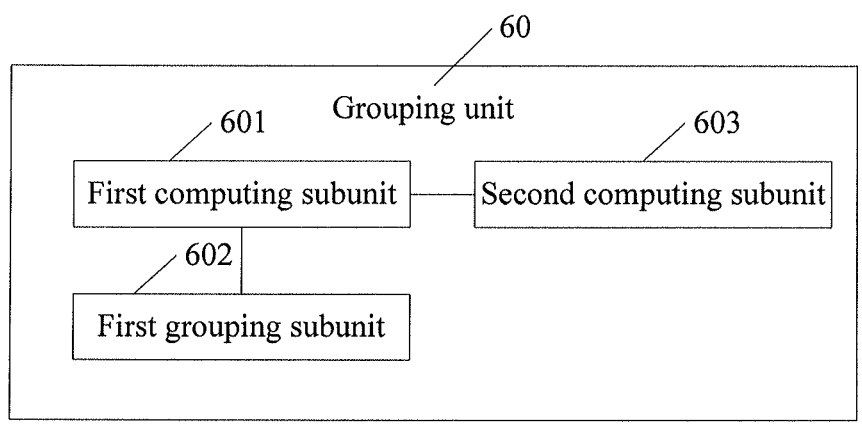
FIG. 7 is a schematic structural diagram of a grouping unit in a network apparatus according to an embodiment of the present invention.

The structure of the grouping unit 60 according to an embodiment is shown in FIG. 7, including:

a first computing subunit 601 configured to compute time when the first MTC devices access the network according to the group parameters, where the group parameters include a data transmission period of the first MTC devices and time duration in unit for uploading data every turn; or a ratio between the data transmission period of the first MTC devices and the time duration in unit for uploading data every turn; or the allowable transmission number for uploading data within a data transmission period configured by the network side for MTC devices in a same group; and the specific computation method includes obtaining the ratio between the data transmission period of the first MTC device and the time duration in unit for uploading data every turn, or obtaining the allowable transmission number for uploading data within a data transmission period configured by the network side for MTC devices in a same group; computing the modulus of the ratio or the allowable transmission number by using an identifier of the first MTC device and obtaining a modulo result, where the relevant identifier of the first MTC device may be an IMSI of the first MTC device; and determining that MTC devices having a same modulo result access the network at the same time; and a first grouping subunit 602 configured to group the first MTC devices according to time when the first MTC devices access the network computed by the first computing subunit 601, where the grouping is so performed that MTC devices accessing the network at same time are grouped into different groups, and MTC devices accessing the network at different time are grouped into a same group.

The sending unit 61 is further configured to send group parameters to the first MTC devices, so that the first MTC devices determine the time for the first MTC devices to access the network according to the group parameters.

The grouping unit 60 may further include:

a second computing subunit 603 configured to compute a frame offset number and subframe number on which the time for the first MTC devices to access the network is located, where floor (i*p/10) is used to compute the frame offset number on which the time for the first MTC devices to access the network within the current data transmission period is located; and (i*p) mod 10 is used to compute the subframe number on which the time for the first MTC devices to access the network within the current data transmission period is located, where i represents the time duration in unit for uploading data every turn, and p represents the modulo result of the relevant identifier of the first MTC device to the ratio or the allowable transmission number.

Figure 8:
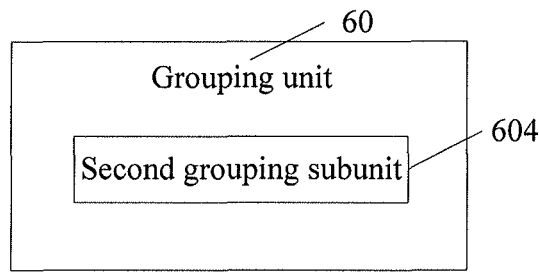
FIG. 8 is a schematic structural diagram of a grouping unit in a network apparatus according to another embodiment of the present invention.

The structure of the grouping unit 60 according to another embodiment is shown in FIG. 8, including:

a second grouping subunit 604 configured to group first MTC devices according to time when the first MTC devices access a network initially, where the grouping is so performed that MTC devices accessing the network at same time are grouped into different groups, and MTC devices accessing the network at different time are grouped into a same group.

In the embodiment of the present invention, the apparatus may be an eNB. The embodiment of the present invention realizes scattering moments for MTC devices to access a network and send data, thereby avoiding collisions and effectively reducing a burden on the network caused by the MTC devices accessing the network concurrently. Meanwhile, embodiments of the present invention solve the problem that numbers of users accessed in different cells are unbalanced which cannot be solved by the random grouping method on the application layer in the prior art.

Figure 9:
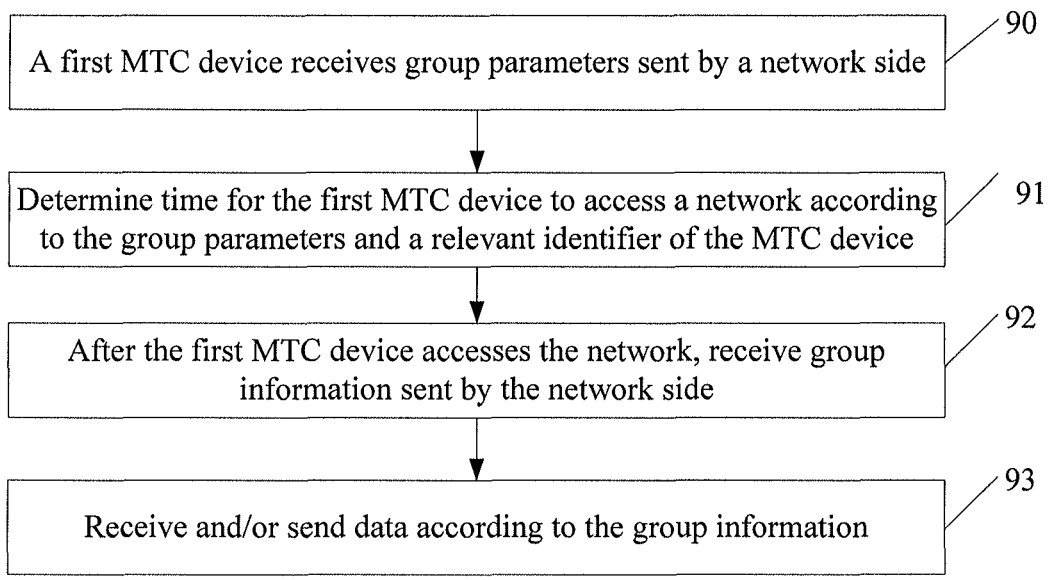
FIG. 9 is a flowchart of a communication method of MTC devices according to another embodiment of the present invention.

Another embodiment of the present invention provides a communication method of MTC devices. This embodiment is operation on the side of MTC devices in the method of the embodiment corresponding to FIG. 1. As shown in FIG. 9, the method includes the following steps.

Step 90. Receive, by a first MTC device, group parameters sent by a network side.

The group parameters are a parameter configured or computed by a network side for the MTC devices and used to determine time for the MTC to access the network, so that the MTC devices may be grouped according to the time for accessing the network. The group parameters may include:

a data transmission period of the first MTC devices configured by a network side for the MTC devices and a time duration in unit for uploading data every turn; or a ratio between the data transmission period of the first MTC devices computed by a network side for the MTC devices and the time duration in unit for uploading data every turn; or the allowable transmission number for uploading data within a data transmission period configured by the network side for MTC devices in a same group.

Moments for the first MTC devices to receive the group parameters are same as that described in the embodiment corresponding to FIG. 1, and will not be described repeatedly herein.

Step 91. Determine time for the first MTC device to access a network according to the group parameters and a relevant identifier of the MTC device.

The determining the time for the first MTC device to access the network according to the group parameters and the relevant identifier of the MTC device includes: obtaining the ratio between the data transmission period of the first MTC device and the time duration in unit for uploading data every turn, or obtaining the allowable transmission number for uploading data within a data transmission period configured by the network side for MTC devices in a same group;

computing a modulus of the ratio or the allowable transmission number by using a relevant identifier of the first MTC device and obtaining a modulo result; and determining that MTC devices having a same modulo result access the network at the same time.

The first MTC device also compute a frame offset number and subframe number on which the time for the first MTC device to access the network is located. The specific computation method is same as that described in the embodiment corresponding to FIG. 1, and will not be described repeatedly herein.

Step 92. After the first MTC device accesses the network, receive group information sent by the network side.

The group information includes any one or more of group paging identifier information GP-RNTI, a radio network temporary identifier of MTC devices, and public radio bearer RB information.

Step 93. Receive and/or send data according to the group information.

The receiving and/or sending, by the first MTC devices, data according to the group information includes:

when the group information includes a GP-RNTI, the first MTC devices access the network when the time for the first MTC devices to access the network is arrived, and then send a paging response; and when the group information includes a radio network temporary identifier of the MTC devices or public RB information, the first MTC devices perform data transmission processing by using the radio network temporary identifier of the first MTC devices or the public RB information.

The embodiment of the present invention realizes configuring or computing group parameters by a network side for MTC devices, and the MTC devices may compute and determine time for accessing a network according to the group parameters delivered by the network side.

Figure 10:
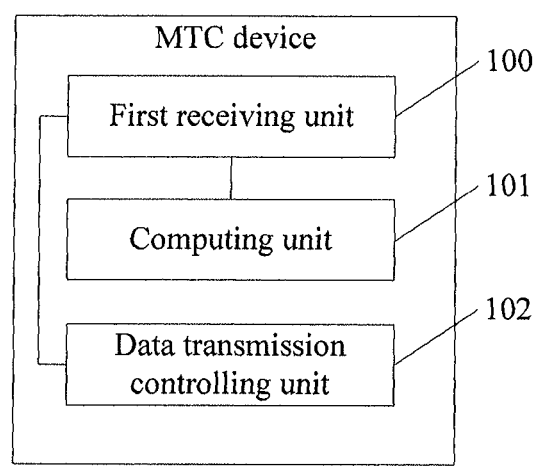
FIG. 10 is a schematic structural diagram of an MTC device according to an embodiment of the present invention.

In order to implement the communication method of MTC devices according to the above embodiment shown in FIG. 9, an embodiment of the present invention further provides an MTC device, as shown in FIG. 10, including:

a receiving unit 100 configured to receive group parameters sent by a network side;

a computing unit 101 configured to determine time for the MTC device to access a network according to a relevant identifier of the MTC device and the group parameters received by the receiving unit 100, where the receiving unit 100 is furthered configured to, after the MTC device accesses the network, receive group information sent by the network side; and a data transmission controlling unit 102 configured to receive and/or send data according to the group information received by the receiving unit 100.

In the embodiment of the present invention, the MTC device is capable of obtaining group parameters configured or computed by the network side for it, and then computing and determining time for accessing a network according to the group parameters delivered by the network side.

In summary, embodiments of the present invention, by grouping MTC devices accessing the network at same time into different groups and MTC devices accessing the network at different time into a same group, realize scattering moments for MTC devices to access a network and send data, thereby avoiding collisions and effectively easing the burden resulted from MTC devices accessing the network concurrently.

Meanwhile, embodiments of the present invention solve the problem that numbers of users accessed in different cells are unbalanced which cannot be solved by the random grouping method on the application layer in the prior art.

Persons skilled in the art may understand that all or part of the steps of the method according to the embodiments may be implemented by a program instructing relevant hardware. The program may be stored in a computer readable storage medium, and the storage medium may be a read-only memory (ROM for short), a random access memory (RAM for short), a magnetic disk, or a CD-ROM, and so on.

The above are only preferential specific embodiments of the present invention. The protection scope of the present invention, however, is not limited thereto. Any alteration or substitution that is within the technical scope disclosed by the present invention and can easily occur to those skilled in the art should be covered in the protection scope of the present invention. Hence the protection scope of the present invention should be determined by the statements in Claims.

The invention claimed is:

1. A communication method of Machine Type Communication (MTC) devices comprising:

grouping, by a network side, first MTC devices according to time when the first MTC devices access a network, to enable the first MTC devices accessing the network at same time to be grouped into different groups, and the first MTC devices accessing the network at different time to be grouped into a same group; and sending, after the first MTC devices access the network, group information to the first MTC devices, so that the first MTC devices perform at least one of receiving and sending data according to the group information;
wherein the time when the first MTC devices access the network comprises one of:
a time when the first MTC devices access the network, which is determined according to a group parameter, wherein the group parameter comprises one of:
a data transmission period of the first MTC devices and time duration in unit for uploading data at every turn;
a ratio between the data transmission period of the first MTC devices and time duration in unit for uploading data at every turn; or
the allowable transmission number for uploading data within a data transmission period configured by the network side for first MTC devices in a same group,
wherein the determining of the time for the first MTC devices to access the network according to the group parameter comprises:
obtaining the ratio between the data transmission period of the first MTC devices and the time duration in unit for uploading data at every turn, or obtaining the allowable transmission number for the first MTC devices to upload data within a data transmission period of the first MTC devices;
computing a modulus of the ratio or the allowable transmission number by using a relevant identifier of the first MTC device and obtaining a modulo result; and
determining that the first MTC devices having a same modulo result access the network at the same time.

2. The method according to claim 1, comprising:
sending the group parameter to the first MTC devices, so that the first MTC devices determine the time for the first MTC devices to access the network according to the group parameter.

3. The method according to claim 1, wherein the determining the time for the first MTC devices to access the network according to the group parameter further comprises: computing a frame offset number and a subframe number on which the time for the first MTC devices to access the network is located, where floor(i*p/10) is used to compute the frame offset number on which the time for the first MTC devices to access the network within the current data transmission period is located; and
(i*p) mod 10 is used to compute the subframe number on which the time for the first MTC devices to access the network within the current data transmission period is located, wherein
i represents the time duration in unit for uploading data at every turn, and p represents the modulo result of the relevant identifier of the first MTC device to the ratio or the allowable transmission number.

4. The method according to claim 1, wherein the group information comprises one or more of group paging identifier information (GP-RNTI), a radio network temporary identifier of a first MTC device, and public radio bearer (RB) information; and
at least one of the receiving and sending, by the first MTC devices, data according to the group information comprises:
when the group information comprises the GP-RNTI, the first MTC devices access the network when the time for the first MTC devices to access the network is due, and then send a paging response; and
when the group information comprises the radio network temporary identifier of the first MTC devices or the public RB information, the first MTC devices perform data transmission processing by using the radio network temporary identifier of the first MTC devices or the public RB information.

5. A network apparatus, comprising:
a processor; and
memory storing program code executed by the processor to configure the network apparatus to:
group first MTC devices according to a time when the first MTC devices access a network, to enable the first MTC devices accessing the network at same time to be grouped into different groups, and the first MTC devices accessing the network at different time to be grouped into a same group; and
after the first MTC devices access the network, send group information of the grouping unit to the first MTC devices, so that the first MTC devices perform at least one of receiving and sending data according to the group information;
wherein the network apparatus is further configured to perform one of:
compute a time for the first MTC devices to access the network according to a group parameter, wherein the group parameter comprises one of:
a data transmission period of the first MTC devices and time duration in unit for uploading data at every turn;
a ratio between the data transmission period of the first MTC devices and time duration in unit for uploading data at every turn; or
the allowable transmission number for uploading data within a data transmission period configured by the network apparatus for first MTC devices in a same group; and
group the first MTC devices according to the time for the first MTC devices to access the network computed by the first computing subunit, to enable first MTC devices accessing the network at the same time to be grouped into different groups,
wherein the first MTC devices accessing the network at different time are to be grouped into a same group;
wherein the computing of the time for the first MTC devices to access the network according to the group parameter comprises:
obtaining the ratio between the data transmission period of the first MTC devices and the time duration in unit for uploading data at every turn, or obtaining the allowable transmission number for the first MTC devices to upload data within a data transmission period of the first MTC devices;
computing a modulus of the ratio or the allowable transmission number by using a relevant identifier of the first MTC device and obtaining a modulo result; and
determining that first MTC devices having a same modulo result access the network at the same time.

6. The apparatus according to claim 5, wherein the processor configures the apparatus to send the group parameter to the first MTC devices, so that the first MTC devices determine the time for the first MTC devices to access the network according to the group parameter.

7. The apparatus according to claim 5, wherein the
processor configures the apparatus to compute a frame offset number and a subframe number on which the time for the first MTC devices to access the network is located, wherein floor(i*p/10) is used to compute the frame offset number on which the time for the first MTC devices to access the network within the current data transmission period is located; and (i*p) mod 10 is used to compute the subframe number on which the time for the first MTC devices to access the network within the current data transmission period is located, wherein i represents the time duration in unit for uploading data at every turn, and p represents the modulo result of the relevant identifier of the first MTC device to the ratio or the allowable transmission number.

8. A communication method of a Machine Type Communication (MTC) device comprising:

receiving, by a first MTC device, a group parameter sent by a network side;

determining a time for the first MTC device to access a network according to the group parameter and a relevant identifier of the first MTC device;

after the first MTC device accessesing the network, receiving group information sent by the network side and at least one of receiving and sending data according to the group information;

wherein the group parameter comprises one of:
 a data transmission period of the first MTC device and time duration in unit for uploading data at every turn;
 a ratio between the data transmission period of the first MTC device and time duration in unit for uploading data at every turn; or
 the allowable transmission number for uploading data within a data transmission period configured by the network side for the first MTC devices in a same group;

wherein the determining of the time for the first MTC device to access the network according to the group parameter and the relevant identifier of the first MTC device comprises:
 obtaining the ratio between the data transmission period of the first MTC device and the time duration in unit for uploading data at every turn, or
 obtaining the allowable transmission number for the first MTC device to upload data within a data transmission period of the first MTC device;
 computing a modulus of the ratio or the allowable transmission number by using a relevant identifier of the first MTC device and obtaining a modulo result; and
 determining that the first MTC devices having a same modulo result access the network at the same time.

9. A Machine Type Communication (MTC) device comprising:

a processor; and memory storing program code executed by the processor to configure the MTC device to:

receive a group parameter sent by a network side;

determine time for the MTC device to access a network according to a relevant identifier of the MTC device and the group parameter received by the receiving unit, wherein the MTC device is furthered configured to, after accessing the network, receive group information sent by the network side; and perform at least one of receiving and sending data according to the received group information;

wherein the group parameter comprises one of:
 a data transmission period of the MTC device and time duration in unit for uploading data at every turn;
 a ratio between the data transmission period of the MTC device and time duration in unit for uploading data at every turn; or
 the allowable transmission number for uploading data within a data transmission period configured by the network side for the MTC devices in a same group;

wherein the determining of the time for the MTC device to access the network according to the relevant identifier of the MTC device and the group parameter comprises one of:
 obtaining the ratio between the data transmission period of the MTC device and the time duration in unit for uploading data at every turn, or
 obtaining the allowable transmission number for the MTC device to upload data within a data transmission period of the MTC device;
 computing a modulus of the ratio or the allowable transmission number by using a relevant identifier of the MTC device and obtaining a modulo result; and
 determining that the MTC devices having a same modulo result access the network at the same time.

* * * * *